(12) United States Patent
Kim et al.

(10) Patent No.: US 11,073,866 B2
(45) Date of Patent: Jul. 27, 2021

(54) ELECTRONIC DEVICE AND METHOD FOR PREVENTING DAMAGE OF DISPLAY

(71) Applicant: Samsung Electronics Co., Ltd., Gyeonggi-do (KR)

(72) Inventors: Minuk Kim, Gyeonggi-do (KR); Jiyong Kim, Gyeonggi-do (KR); Jongdae Park, Gyeonggi-do (KR); Keunsik Lee, Gyeonggi-do (KR); Hoondo Heo, Gyeonggi-do (KR); Changryong Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/747,674

(22) Filed: Jan. 21, 2020

(65) Prior Publication Data

US 2020/0233461 A1   Jul. 23, 2020

(30) Foreign Application Priority Data

Jan. 21, 2019   (KR) .................. 10-2019-0007484

(51) Int. Cl.
  *G06F 1/16*   (2006.01)
  *H04M 1/02*   (2006.01)
  *G06F 3/01*   (2006.01)

(52) U.S. Cl.
  CPC .......... *G06F 1/1641* (2013.01); *G06F 1/1652* (2013.01); *G06F 3/016* (2013.01); *H04M 1/0268* (2013.01); *G06F 3/017* (2013.01)

(58) Field of Classification Search
  CPC ...... G06F 1/1641; G06F 1/1652; G06F 3/016; G06F 3/017; H04M 1/0268
  See application file for complete search history.

(56) References Cited

U.S. PATENT DOCUMENTS

| | | |
|---|---|---|
| 6,070,140 A | 5/2000 | Tran |
| 6,223,294 B1 | 4/2001 | Kondoh |
| 6,449,496 B1 | 9/2002 | Beith et al. |
| 6,532,447 B1 | 3/2003 | Christensson |
| 7,176,902 B2 | 2/2007 | Peterson, Jr. et al. |
| 7,633,076 B2 | 12/2009 | Huppi et al. |

(Continued)

FOREIGN PATENT DOCUMENTS

| | | |
|---|---|---|
| CN | 1757027 A | 4/2006 |
| CN | 201000588 Y | 1/2008 |

(Continued)

OTHER PUBLICATIONS

International Search Report dated May 14, 2020.

*Primary Examiner* — Michael Pervan

(74) *Attorney, Agent, or Firm* — Cha & Reiter, LLC.

(57) ABSTRACT

An foldable electronic device and method are disclosed. The device includes: a foldable housing rotatable about a hinge, enabling folding of a flexible display. The device further includes a touch sensor, a first processor and a second processor. The processors implement the method, including: by the first processor, detecting an external object contacting the flexible display and requesting activation of the second processor based on the detection; and by the second processor: activating and outputting a notification warning of potential damage to the flexible display if the device is folded closed with the external object present on the flexible display.

20 Claims, 13 Drawing Sheets

(56) References Cited

U.S. PATENT DOCUMENTS

| | | | |
|---|---|---|---|
| 8,072,379 B2 | 12/2011 | Gopinath | |
| 8,145,053 B2 | 3/2012 | Sakurai | |
| 8,230,246 B1 | 7/2012 | Sharkey | |
| 8,706,172 B2 | 4/2014 | Priyantha et al. | |
| 8,816,985 B1 | 8/2014 | Tate et al. | |
| 8,819,467 B2 | 8/2014 | Park et al. | |
| 8,912,877 B2 | 12/2014 | Ling et al. | |
| 9,047,055 B2 | 6/2015 | Song | |
| 9,063,731 B2 | 6/2015 | Heo et al. | |
| 9,430,024 B2 | 8/2016 | Heo et al. | |
| 9,524,030 B2* | 12/2016 | Modarres | H04M 1/0268 |
| 9,606,625 B2* | 3/2017 | Levesque | G06F 1/1652 |
| 10,048,758 B2* | 8/2018 | Modarres | G06F 1/1641 |
| 10,241,553 B2 | 3/2019 | Heo et al. | |
| 10,372,164 B2* | 8/2019 | Huitema | G06F 3/0346 |
| 10,551,969 B2* | 2/2020 | Jeong | H04R 1/02 |
| | | | 381/333 |
| 2002/0180724 A1 | 12/2002 | Oshima et al. | |
| 2003/0040339 A1 | 2/2003 | Chang | |
| 2003/0177402 A1 | 9/2003 | Piazza | |
| 2003/0226044 A1 | 12/2003 | Cupps et al. | |
| 2006/0161377 A1 | 7/2006 | Rakkola et al. | |
| 2007/0078487 A1 | 4/2007 | Vaisnys et al. | |
| 2007/0102525 A1 | 5/2007 | Orr et al. | |
| 2007/0140199 A1 | 6/2007 | Zhao et al. | |
| 2007/0273673 A1 | 11/2007 | Park et al. | |
| 2009/0135751 A1 | 5/2009 | Hodges et al. | |
| 2009/0259865 A1 | 10/2009 | Sheynblat et al. | |
| 2009/0278738 A1 | 11/2009 | Gopinath | |
| 2010/0007801 A1 | 1/2010 | Cooper et al. | |
| 2010/0013778 A1 | 1/2010 | Liu et al. | |
| 2010/0235667 A1 | 9/2010 | Mucignat et al. | |
| 2010/0268831 A1 | 10/2010 | Scott et al. | |
| 2010/0302028 A1 | 12/2010 | Desai et al. | |
| 2010/0306711 A1 | 12/2010 | Kahn et al. | |
| 2010/0313050 A1 | 12/2010 | Harrat et al. | |
| 2011/0071759 A1 | 3/2011 | Pande et al. | |
| 2011/0074693 A1 | 3/2011 | Ranford et al. | |
| 2011/0077865 A1 | 3/2011 | Chen et al. | |
| 2011/0105955 A1 | 5/2011 | Yudovsky et al. | |
| 2011/0126014 A1 | 5/2011 | Camp, Jr. et al. | |
| 2011/0162894 A1 | 7/2011 | Weber | |
| 2012/0005509 A1 | 1/2012 | Araki et al. | |
| 2012/0071149 A1 | 3/2012 | Bandyopadhyay et al. | |
| 2012/0096290 A1 | 4/2012 | Shkolnikov et al. | |
| 2012/0100895 A1 | 4/2012 | Priyantha et al. | |
| 2012/0154292 A1 | 6/2012 | Zhao et al. | |
| 2012/0191993 A1 | 7/2012 | Drader et al. | |
| 2012/0212319 A1 | 8/2012 | Ling et al. | |
| 2012/0243719 A1* | 9/2012 | Franklin | H04R 1/02 |
| | | | 381/333 |
| 2012/0249431 A1 | 10/2012 | Li | |
| 2012/0254878 A1 | 10/2012 | Nachman et al. | |
| 2013/0082937 A1 | 4/2013 | Liu et al. | |
| 2013/0082939 A1 | 4/2013 | Zhao et al. | |
| 2013/0265276 A1 | 10/2013 | Obeidat et al. | |
| 2013/0290761 A1 | 10/2013 | Moon et al. | |
| 2013/0307809 A1 | 11/2013 | Sudou | |
| 2013/0314349 A1 | 11/2013 | Chien et al. | |
| 2014/0006825 A1 | 1/2014 | Shenhav | |
| 2014/0025973 A1 | 1/2014 | Schillings et al. | |
| 2014/0049480 A1 | 2/2014 | Rabii | |
| 2014/0075226 A1 | 3/2014 | Heo et al. | |
| 2014/0149754 A1 | 5/2014 | Silva et al. | |
| 2014/0237277 A1 | 8/2014 | Mallinson et al. | |
| 2014/0285449 A1 | 9/2014 | Cho et al. | |
| 2014/0320393 A1* | 10/2014 | Modarres | G06F 3/017 |
| | | | 345/156 |
| 2015/0185909 A1 | 7/2015 | Gecnuk | |
| 2015/0286263 A1 | 10/2015 | Heo et al. | |
| 2016/0103488 A1* | 4/2016 | Levesque | G09G 5/003 |
| | | | 345/156 |
| 2016/0306393 A1* | 10/2016 | Huitema | G06F 1/1698 |
| 2017/0034331 A1 | 2/2017 | Hao et al. | |
| 2017/0060248 A1* | 3/2017 | Modarres | G06F 3/016 |
| 2018/0088736 A1* | 3/2018 | Jeong | G06F 3/0412 |
| 2019/0073035 A1* | 3/2019 | Modarres | G06F 3/017 |

FOREIGN PATENT DOCUMENTS

| | | |
|---|---|---|
| CN | 101751112 A | 6/2010 |
| CN | 101978748 A | 2/2011 |
| CN | 102461135 A | 5/2012 |
| CN | 102508591 A | 6/2012 |
| EP | 2 479 642 A1 | 7/2012 |
| EP | 2 482 167 A1 | 8/2012 |
| JP | 6-95787 A | 4/1994 |
| JP | 10-333789 A | 12/1998 |
| JP | 11-102253 A | 4/1999 |
| JP | 2003-501959 A | 1/2003 |
| JP | 2005-283843 A | 10/2005 |
| JP | 2011-139301 A | 7/2011 |
| JP | 2002-536917 A | 10/2012 |
| JP | 2014-49011 A | 3/2014 |
| KR | 10-0748984 B1 | 8/2007 |
| KR | 10-2010-0061894 A | 6/2010 |
| KR | 10-2011-0071216 A | 6/2011 |
| WO | 2017/119531 A1 | 7/2017 |

* cited by examiner

ELECTRONIC DEVICE AND METHOD FOR PREVENTING DAMAGE OF DISPLAY

CROSS-REFERENCE TO RELATED APPLICATION(S)

This application is based on and claims priority under 35 U.S.C. § 119 to Korean Patent Application No. 10-2019-0007484, filed on Jan. 21, 2019, in the Korean Intellectual Property Office, the disclosure of which is herein incorporated by reference in its entirety.

BACKGROUND

Field

Certain embodiments of the disclosure relate to an electronic device which prevents a damage of a display and a method thereof.

Description of Related Art

Electronic devices that include a camera function, such as smartphones, tablet personal computers (PCs), smart watches, or the like, have developed in sophistication and complexity. There is presently a push to develop electronic devices that maintain large screen space without sacrificing portability.

The above information is presented as background information only to assist with an understanding of the disclosure. No determination has been made, and no assertion is made, as to whether any of the above might be applicable as prior art with regard to the disclosure.

SUMMARY

Foldable electronic devices may provide larger display areas than traditional devices, without sacrificing portability. The foldable electronic device may include a first housing including a first surface and a second surface facing away from the first surface, a second housing including a third surface and a fourth surface facing away from the third surface, and a folding part rotatably connecting a side surface of the first housing and a side surface of the second housing facing the side surface of the first housing. The display may be implemented using a flexible display which is disposed on the first surface and the third surface which are configured to close upon one another based on rotation around the folding part.

When a foreign object is disposed on the flexible display, the flexible display may be damaged by the foreign object when the flexible display is set into a closed configuration and the first surface and third surface contact one another. Accordingly, it is desirable to produce a foldable device that includes safeguards which prevent damage from the unintentional deposition of foreign material on the flexible display damaging the flexible display when set into a closed or folded configuration.

The disclosure is not limited to those mentioned above, and other technical aspects of the disclosure that are not explicitly mentioned above may be understood to belong to the disclosure by those skilled in the art, based on the detailed description provided further below.

An electronic device according to certain embodiments may include: a first housing including a first surface and a second surface facing away from the first surface, a second housing including a third surface and a fourth surface facing away from the third surface, a folding part configured to pivotably couple a side surface of the first housing and a side surface of the second housing, a flexible display disposed on the first surface and the third surface, the flexible display covering the folding part, and including a first area corresponding to the first surface and a second area corresponding to the third surface, a touch sensor configured to detect a touch input on the first area and the second area, a first processor operatively coupled with the touch sensor, and a second processor operatively coupled with the flexible display and the first processor, and wherein the first processor is configured to: detect an external object contacting the first area or the second area through the touch sensor while the second processor is in a sleep state, request activation of the second processor based on detecting the external object, and wherein the second processor is configured to: activate in response to the request from the first processor, and output a notification upon activation.

According to certain embodiments, there is provided a method for operating an electronic device, including: detecting, by a first processor and a touch sensor, an external object contacting a surface of the flexible display while a second processor is in a sleep state, requesting, by the first processor, activation of the second processor based at least on the detecting the external object, activating the second processor in response to the request from the first processor, and outputting, by the second processor, a notification upon activation.

An electronic device according to certain embodiments may include: a first housing including a first surface and a second surface facing away, a second housing including a third surface and a fourth surface facing away, a folding part configured to pivotably couple a side surface of the first housing and a side surface of the second housing, a flexible display disposed on the first surface and the third surface, the flexible display covering the folding part, and including a first area corresponding to the first surface and a second area corresponding to the third surface, a force touch sensor configured to detect a pressure intensity of a touch input on the flexibly display, a first processor operatively coupled with the touch sensor, and a second processor operatively coupled with the flexible display and the first processor, wherein the first processor is configured to: identify the pressure intensity of an external object contacting the flexible display through the force touch sensor while the second processor is in a sleep state, and in response detecting that the pressure intensity is greater than a reference intensity, request activation of the second processor, wherein the second processor is configured to: activate in response to the request from the first processor, and output a notification upon activation.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
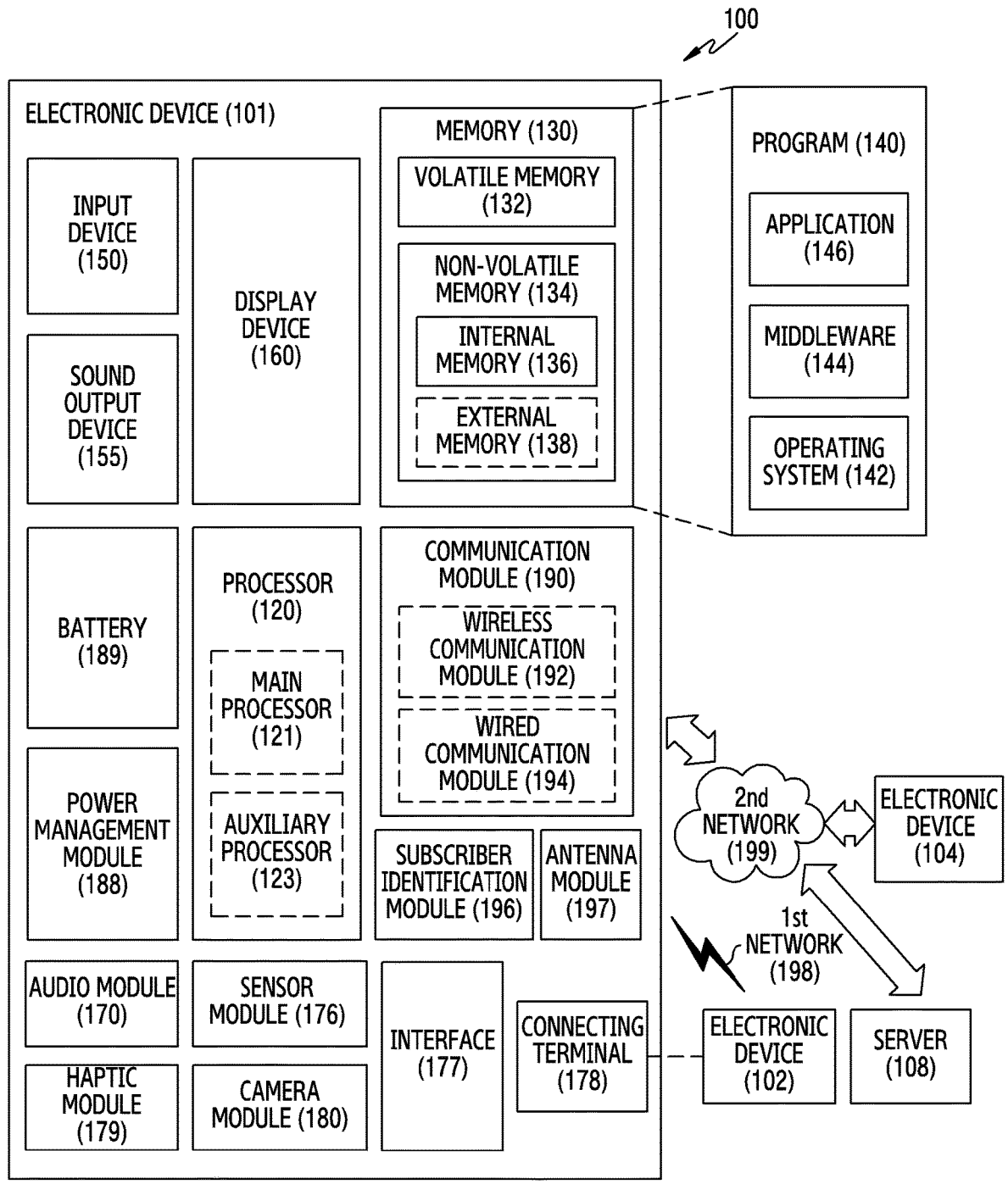
FIG. 1 is a block diagram of an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic actuator 179 (or haptic module), a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
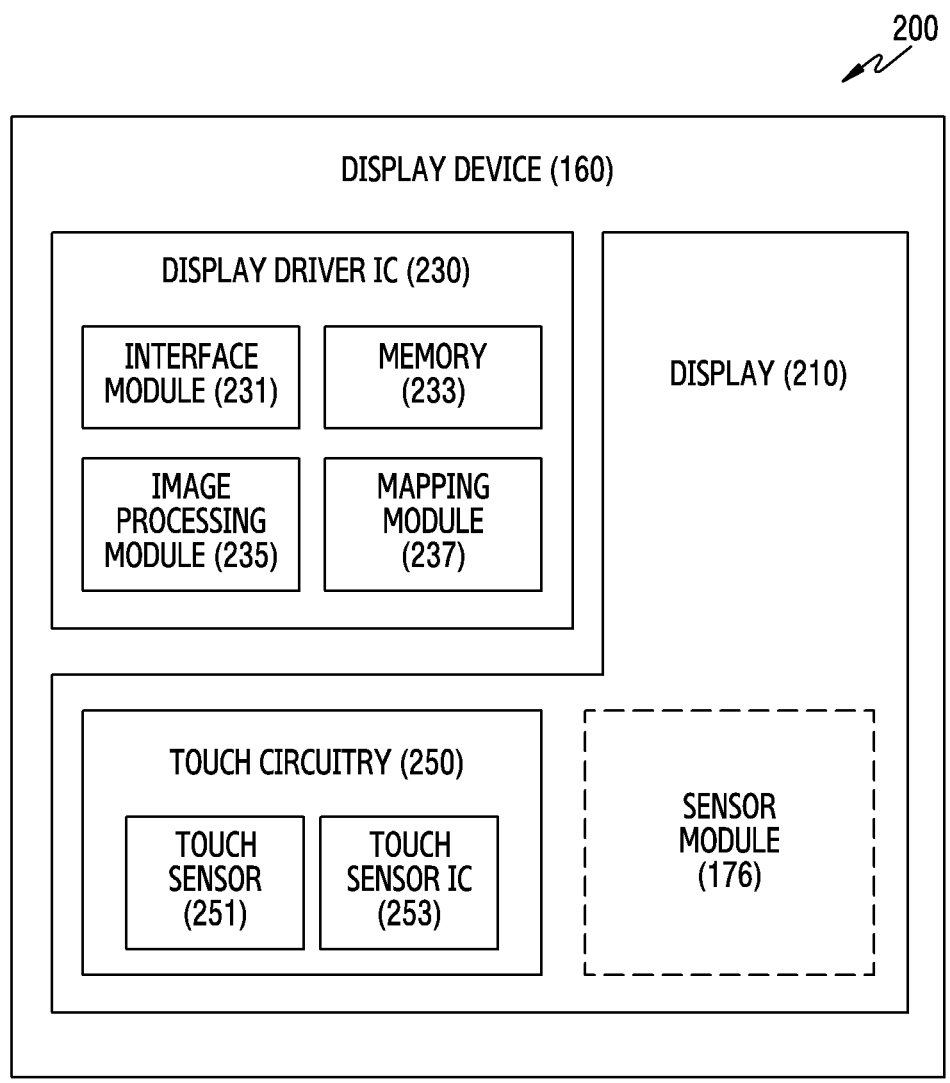
FIG. 2 is a block diagram of a display device according to an embodiment.

FIG. 2 is a block diagram 200 illustrating the display device 160 according to an embodiment. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 3:
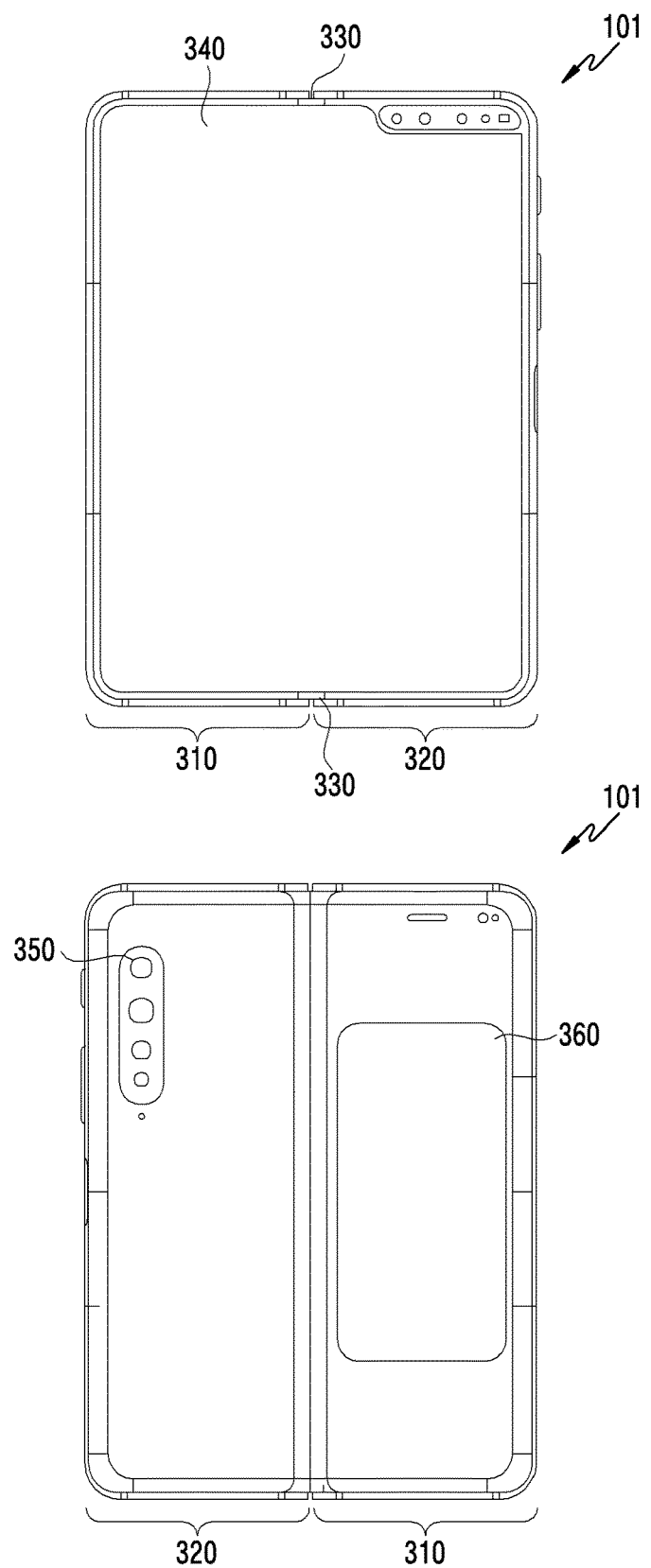
FIG. 3 is a view illustrating an example of a front view and a rear view of an electronic device in an outspread state according to an embodiment.

FIG. 3 illustrates an example of a front view and a rear view of an electronic device in an outspread state according to an embodiment.

Referring to FIG. 3, the electronic device 101 according to an embodiment may include a first housing 310, a second housing 320, a folding part 330, a flexible display 340, at least one camera 350, and/or a display 360.

In an embodiment, the first housing 310 may include a first surface and a second surface facing away from the first surface (e.g., front and back of the first housing). In an embodiment, the second housing 320 may include a third surface and a fourth surface facing away from the third surface (e.g., front and back of the second housing).

In an embodiment, the first housing 310 and the second housing 320 may be connected by the folding part 330. For example, the folding part 330 may be configured to pivotably and/or rotatably couple the first housing 310 and the second housing 320 by connection with a side surface of the first housing 310 and a side surface of the second housing 320 (e.g., the second side housing facing the first side surface of the first housing 310).

The flexible display 340 may be disposed on the first housing 310 and the second housing 320, including overage over and across the folding part 330. In an embodiment, the flexible display 340 may be supported by the first housing 310 and the second housing 320. In an embodiment, the flexible display 340 may be disposed on the first surface and the third surface, spanning across the folding part 330. In an embodiment, the flexible display 340 may include a first area corresponding to the first surface and a second area corresponding to the third surface.

In an embodiment, the electronic device 101 may be set into a folded configuration, with reference to bending about the folding part 330. For example, the folding part 330 may be disposed between the first housing 310 and the second housing 320 of the electronic device 101 to crook, bend, or fold the electronic device 101. In an embodiment, the first housing 310 may be coupled with the second housing 320 through the folding part 330 to rotate about the folding part 330. In an embodiment, the second housing 320 may be coupled with the first housing 310 through the folding part 330 to rotate about the folding part 330. In an embodiment, the first housing 310 and the second housing 320 may rotate about the folding part 330, thereby being folded to face each other. In an embodiment, the first housing 310 and the second housing 320 may substantially overlap each other or may be overlaid with each other.

In an embodiment, the electronic device 101 may be set in a first state in which the first housing 310 and the second housing 320 are unfolded, about the folding part 330. In an embodiment, in the first state, the first surface may be substantially flush with the third surface. In an embodiment, the electronic device 101 may provide the first state in which the first housing 310 and the second housing 320 are substantially flush with each other by folding out the folding part 330. In an embodiment, the first state may refer to a state in which all of the first area corresponding to the first surface in the entire area of the flexible display 340, the second area corresponding to the third surface in the entire area of the flexible display 340, and a third area surrounding the folding part 330 in the entire area of the flexible display 340 are provided within a field of view or an angle of view of a user facing the front surface of the electronic device 101. In an embodiment, the first state may be referred to as an outspread state or outspreading state or an unfolding state.

In an embodiment, the electronic device 101 may be set in a second state in which the first housing 310 and the second housing 320 are folded into a stowed configuration, by rotation about the folding part 330. In an embodiment, in the second state, the first surface may be overlaid on the third surface. In an embodiment, the folding part 330 may be folded in to have the front surface (for example, the first surface) of the first housing 310 and the front surface (for example, the third surface) of the second housing 320 face each other, such that the electronic device 101 provides the second state in which the first housing 310 and the second housing 320 are disposed in parallel with each other. In an embodiment, the second state may refer to a state in which the flexible display 340 is hidden within the field of view or angle of view of the user facing the front surface of the electronic device 101. In an embodiment, the second state may be referred to as a folded state or folding state.

In an embodiment, the flexible display 340 may be disposed on the front surface (for example, the third surface) of the second housing 320 across the first housing 310 and the folding part 330. According to some embodiments, the flexible display 340 may include a flexible touch screen device including a touch sensor. In an embodiment, the flexible display 340 may include a touch sensor and a force touch sensor. The electronic device 101 according to an embodiment may be folded with reference to the folding part 330. Since the flexible display 340 is disposed from the first housing 310 to the second housing 320 across the folding part 330, the flexible display 340 may be bent by the folding operation of the electronic device 101. For example, the third area of the flexible display 340 disposed on the folding part 330 may be bent according to the folding operation of the electronic device 101, unlike the first area disposed on the first surface of the first housing 310 and the second area disposed on the third surface of the second housing 320. In an embodiment, the third area may be curved and bent to prevent a damage of the flexible display 340.

In an embodiment, one or more of the first area or the second area may further include a curved area like the third area. For example, a distal end situated from the center of the first housing 310 may include a rounded area. In another example, a distal end situated from the center of the second housing 320 may include a rounded area. In an embodiment, since a curved display area included in the first area and a curved display area included in the second area are disposed on distal ends of the first housing 310 and the second housing 320, respectively, the curved display areas may be referred to as edge displays.

In an embodiment, at least one camera 350 may be exposed through at least a portion of the rear surface (for example, the fourth surface) of the second housing 320. In an embodiment, the at least one camera 350 may include a plurality of cameras having different characteristics. For example, the at least one camera 350 may include at least one telephoto camera and at least one wide-angle camera. In another example, the at least one camera 350 may include at least one monochrome camera for obtaining a monochrome image, and at least one red, green, blue (RGB) camera for obtaining a color image. However, this should not be considered as limiting.

In an embodiment, the display 360 may be exposed through at least a portion of the rear surface (for example, the second surface) of the first housing 310.

Figure 4:
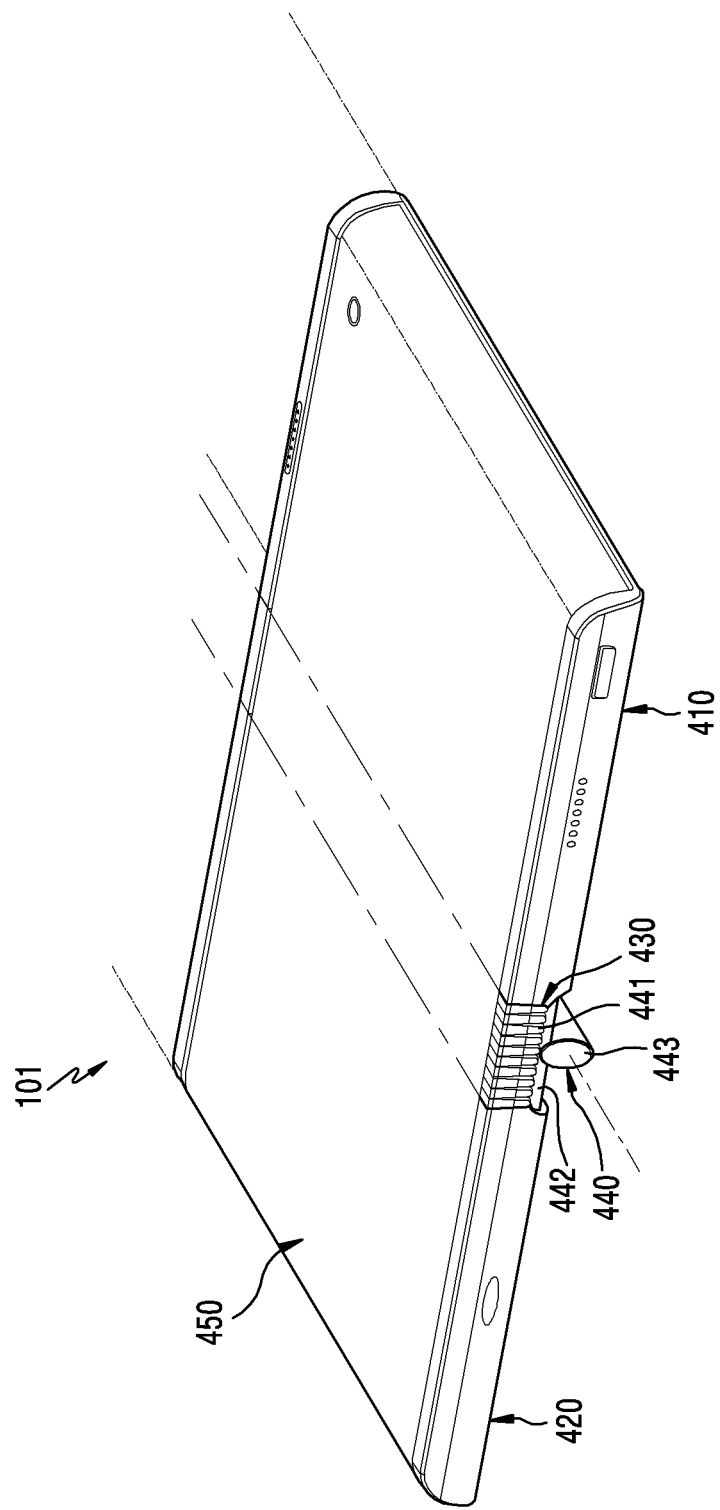
FIG. 4 is a perspective view illustrating a front view of an electronic device in an outspread state according to an embodiment.

FIG. 4 is a perspective view illustrating a front view of an electronic device in an outspread state according to an embodiment.

Referring to FIG. 4, a foldable electronic device 101 according to an embodiment may include a first housing 410, a second housing 420, a folding part 430 (or folding portion), a hinge 440, and a flexible display 450.

In an embodiment, the first housing 410 may include a first surface and a second surface facing away from the first surface. In an embodiment, the second housing 420 may include a third surface and a fourth surface facing away from the third surface.

In an embodiment, the first housing 410 and the second housing 420 may be coupled with each other by the folding part 430. For example, the folding part 430 may be configured to pivotably or rotatably couple the first housing 410 and the second housing 420 connection to a side surface of the first housing 410 and a side surface of the second housing 420 facing the side surface of the first housing 410. The hinge 440 may be disposed on a center of a rear surface of the electronic device 101. In an embodiment, the hinge 440 may define at least a portion of an exterior of the rear surface of the electronic device 101. According to an embodiment, the electronic device 101 may include a hinge center part 443 formed on a center of the hinge 440. The hinge center part 443 may be configured to serve as a center axis for a rotational operation when the first housing 410 and the second housing 420 are folded by using the folding part 430. The flexible display 450 may be disposed on the first housing 410 and the second housing 420 across the folding part 430. In an embodiment, the flexible display 450 may be installed to be supported by the first housing 410 and the second housing 420. In an embodiment, the flexible display 450 may be disposed on the first surface and the third surface across the folding part 430. In an embodiment, the flexible display 450 may include a first area corresponding to the first surface and a second area corresponding to the third surface.

The electronic device 101 according to an embodiment may be folded with reference to the folding part 430. For example, the folding part 430 may be disposed between the first housing 410 and the second housing 420 of the electronic device 101 to crook, bend, or fold the electronic device 101. In an embodiment, the first housing 410 may be coupled with the second housing 420 through the folding part 430 to rotate about the folding part 430. In an embodiment, the first housing 410 and the second housing 420 may be rotated by the folding part 430 by using the hinge center part 443 of the hinge 440 as a rotation axis, thereby being folded to face each other. In an embodiment, the first housing 410 and the second housing 420 may substantially overlap each other or may be overlaid with each other.

In an embodiment, the electronic device 101 may provide a first state in which the first housing 410 and the second housing 420 are folded out by the folding part 430. In an embodiment, in the first state, the first surface may be substantially flush with the third surface. In an embodiment, the electronic device 101 may provide the first state in which the first housing 410 and the second housing 420 are substantially flush with each other by folding out the folding part 430. In an embodiment, the first state may refer to a state in which all of the first area corresponding to the first surface in the entire area of the flexible display 450, the second area corresponding to the third surface in the entire area of the flexible display 450, and a third area surrounding the folding part 430 in the entire area of the flexible display 450 are provided within a field of view or an angle of view of a user facing the front surface of the electronic device 101. In an embodiment, the first state may be referred to as an outspread state or outspreading state or an unfolding state.

In an embodiment, the electronic device 101 may provide a second state in which the first housing 410 and the second housing 420 are folded in by the folding part 430. In an embodiment, in the second state, the second surface may be overlaid on the fourth surface. In an embodiment, the folding part 430 may be folded in to have the rear surface (for example, the second surface) of the first housing 410 and the rear surface (for example, the fourth surface) of the second housing 420 face each other, such that the electronic device 101 provides the second state in which the first housing 410 and the second housing 420 are disposed in parallel with each other. In an embodiment, the second state may refer to a state in which the first area corresponding to the first surface in the entire area of the flexible display 450 and at least a portion of the third area surrounding the folding part 430 in the entire area of the flexible display 450 are provided within the field of view or angle of view of the user facing the front surface of the electronic device 101. In an embodiment, the second state may be referred to as a folded state or folding state.

In an embodiment, the folding part 430 may include a plurality of folding members. The plurality of folding members may be rotatably connected with one another to allow the electronic device 101 to be folded. For example, the plurality of folding members neighboring one another may be coupled to one another by means of a hinge to perform a rotational motion. In an embodiment, the plurality of folding members neighboring the first housing 410 and the second housing 420 may be coupled to one another by means of the hinge, and may be folded by a constant curvature in phases when the foldable electronic device is folded in or out. In an embodiment, the electronic device 101 may be folded by the mutual rotational motion between the plurality of folding members included in the folding part 430, to have the respective rear surfaces of the first housing 410 and the second housing 420 face each other.

In an embodiment, the plurality of folding members may include a main body having a predetermined length and both ends disposed at both sides of the main body. A front surface of the main body of the plurality of folding members may not be exposed to the outside by the flexible display 450 disposed across the folding part 430. A rear surface of the main body of the plurality of folding members may not be exposed to the outside by the hinge 440 disposed on the rear surface of the folding part. In an embodiment, both ends of the plurality of folding members may be exposed to the outside of the electronic device 101 and may be disposed as a part of the outer surface. The number of the plurality of folding members may vary according to a thickness of the electronic device 101. In an embodiment, both ends of the plurality of folding members may have various shapes for a mutually folding function. For example, each of the both ends of the plurality of folding members may include a hexagon including a gap formed in a folding direction, or a circle formed in one direction, or a circle formed in both directions with reference to the innermost center folding member.

In an embodiment, the hinge 440 may include a first plane part 441, a second plane part 442, and the hinge center part 443. The hinge center part 443 may rotatably couple the first plane part 441 and the second plane part 442. For example, a hinge arm formed on one end of the first plane part 441 and a hinge arm formed on the second plane part 442 may be coupled to each other, thereby forming the hinge center part 443. In another example, the hinge arm of the first plane part 441 and the hinge arm of the second plane part 442 forming the hinge center part 443 may be integrally formed with the respective plane parts, but may be separately formed and fixed to the plane parts. The hinge center part 443 may be disposed on the center of the hinge 440.

Figure 5:
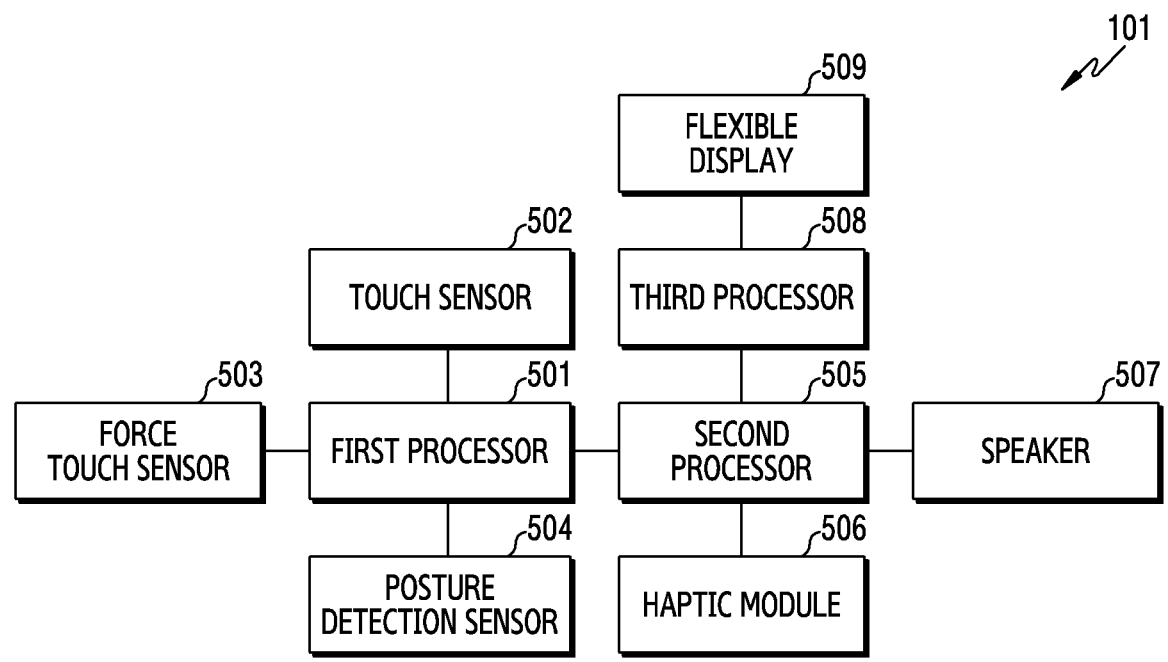
FIG. 5 is a view illustrating an example of a functional configuration of an electronic device according to an embodiment.

FIG. 5 illustrates an example of a functional configuration of an electronic device according to an embodiment. The functional configuration may be included in the electronic device 101 shown in FIGS. 1, 3, and 4.

Referring to FIG. 5, the electronic device 101 may include a first processor 501, a touch sensor 502, a force touch sensor 503, a configuration detection sensor 504, a second processor 505, a haptic module 506, a speaker 507, a third processor 508, and a flexible display 509.

In an embodiment, the first processor 501 may include the auxiliary processor 123 shown in FIG. 1. In an embodiment, the first processor 501 may include the touch sensor IC 253 shown in FIG. 2.

In an embodiment, the first processor 501 may be operatively coupled with the touch sensor 502 configured to detect a touch input on a display area of the flexible display 509 (for example, the first area, the second area shown in FIG. 3, or the first area, the second area, and the third area shown in FIG. 4), the force touch sensor 503 configured to detect an intensity of depression of the touch input, the configuration detection sensor 504 configured to detect a folding state of the flexible display 509, and the second processor 505.

In an embodiment, the second processor 505 may include the main processor 121 shown in FIG. 1.

In an embodiment, the second processor 505 may be operatively coupled with the third processor 508 configured to control displaying a screen on the flexible display 509, the haptic module 506 including the haptic module 179 shown in FIG. 1, and the speaker 507 including the sound output device 155 shown in FIG. 1.

In an embodiment, the third processor 508 may include the auxiliary processor 123 shown in FIG. 1. In an embodiment, the third processor 508 may include the display driver IC 230 shown in FIG. 2. In an embodiment, the third processor 508 may be referred to as a display controller since the third processor 508 may control the flexible display 509.

In an embodiment, as shown in FIG. 3, the flexible display 509 may include the first area corresponding to the first surface of the first housing 310 and the second area corresponding to the third surface of the second housing 320 as a display area. In an embodiment, as shown in FIG. 4, the flexible display 509 may include the first area corresponding to the first surface of the first housing 410, the second area corresponding to the third surface of the second housing 420, and the third area surrounding the folding part 430 as a display area. In an embodiment described below, the electronic device 101 having the exterior of FIG. 3 will be described, but certain embodiments described below can be applied to the electronic device 101 having the exterior of FIG. 4.

In an embodiment, the flexible display 509 may be integrally formed with the touch sensor 502 and the force touch sensor 503.

Figure 6:
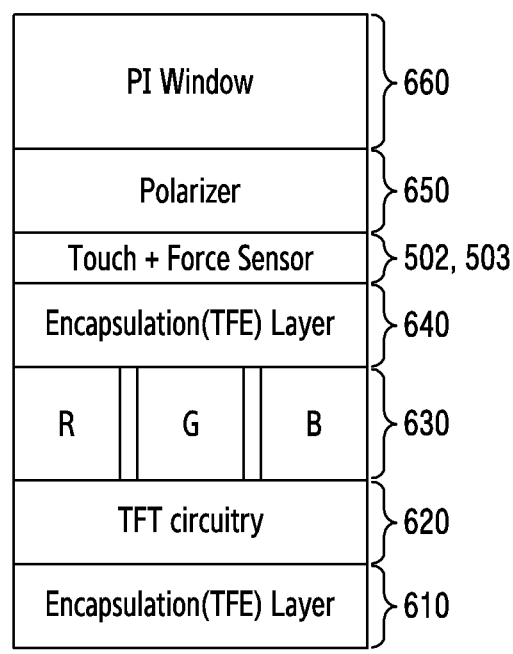
FIG. 6 is a view illustrating an example of a structure of a flexible display of an electronic device according to an embodiment.

For example, referring to FIG. 6, the flexible display 509 (for example, the flexible display 360 of FIG. 3 or the flexible display 450 of FIG. 4) integrally formed with the touch sensor 502 and the force touch sensor 503 may include a substrate 610, a thin film transistor (TFT) 620 disposed on the substrate 610, a light emission layer 630 disposed on the TFT 620, an encapsulation layer 640 disposed on the light emission layer 630, the touch sensor 502 and the force touch sensor 503 disposed on the encapsulation layer 640, an optical layer 650 disposed on the touch sensor 502 and the force touch sensor 503, and a flexible window 660 disposed on the optical layer 650.

The first substrate 610 may be a base plate based on which a panel including the TFT 620 and the light emission layer 630 is formed, and the panel may be formed on the first substrate 610 through a series of fabrication processes.

According to an embodiment, the first substrate 610 is formed in a plate shape having both side surfaces, and for example, may be formed with a material such as plastic having flexibility like polyimide (PI).

According to an embodiment, the panel may include the TFT 620 and the light emission layer 630 having a plurality of pixels formed therein to be controlled by the TFT 620. The TFT 620 may be disposed between the light emission layer 630 and the first substrate 610, and layers of the TFT 620 may be formed on a first surface of the first substrate 610 through a series of processes such as deposition, patterning, etching, or the like. For example, an active layer (or a semiconductor layer) formed with a semiconductor material such as poly-silicon may be formed on the first surface of the first substrate 610, and a gate electrode, a source electrode, and a drain electrode for driving the active layer may be formed. The source electrode may be an electrode that provides electrons, and the drain electrode may be an electrode that receives electrons. The gate electrode may be an electrode for controlling electron movement from the source electrode to the drain electrode. The active layer may be electrically connected with the source electrode and the drain electrode, and, when a voltage of a predetermined level or higher is applied to the gate electrode, the gate electrode may serve as a path (or channel) enabling electrons to be moved, like a conductor.

According to an embodiment, the light emission layer 630 may include an organic light emitting diode (OLED), and may include an anode, a cathode, and an organic material layer formed on the TFT 620 through evaporation. The anode may be an electrode which emits holes, the cathode may be an electrode which emits electrons, and the organic material layer may be disposed between the anode and the cathode. A current may flow to the source electrode, the active layer, and the drain electrode due to a reaction of the active layer of the TFT 620, and a voltage may be applied to the anode and the cathode of the light emission layer 630 electrically connected with the TFT 620. Accordingly, electrons discharged from the cathode and holes discharged from the anode may be coupled to each other in the organic material layer, and exciton energy may be discharged from the organic material layer in the form of light due to the coupling of the electrons and the holes. The light emission layer 630 including such an OLED may be defined as a "organic light emission layer." According to an embodiment, the light emission layer 630 may be substituted with a light emitting element of a structure different from the OLED.

According to an embodiment, the TFT 620 may be a low temperature polycrystalline silicon (LTPS)-based TFT. According to a certain embodiment, the TFT 620 may be an amorphous silicon (a-Si)-based TFT.

According to an embodiment, the panel may include the encapsulation layer 640 to prevent the light emission layer 630 from being influenced by the outside. Since the organic material layer, the anode, or the cathode included in the light emission layer 630 may react with oxygen or moisture and may lose their light emitting characteristics, the encapsulation layer 640 may serve as a seal that prevents the light emission layer 630 from being exposed to the outside, and may prevent oxygen or moisture from permeating the light emission layer 630. According to an embodiment, the encapsulation layer 640 may include a thin film encapsulation.

According to an embodiment, the panel may further include the touch sensor 502 and the force touch sensor 503 which are disposed on the encapsulation layer 604 and are operatively coupled with the first processor 501.

According to an embodiment, the panel may further include the optical layer 650 which is disposed on the touch sensor 502 and the force touch sensor 503. The optical layer 650 may include a retardation layer (or a retarder) and a polarizing layer (or a polarizer) disposed on the retardation layer. When unpolarized light such as light of the sun enters the panel, the unpolarized light may be changed to linearly polarized light by passing through the polarizing layer, and the linearly polarized light may be changed to circularly polarized light by passing through the retardation layer. For example, when the unpolarized light passes through a 90° polarizing layer, the unpolarized light may be changed to 90° linearly polarized light, and, when the 90° linearly polarized light passes through a 45° retardation layer, the 90° linearly polarized light may be changed to 135° circularly polarized light. The 135° circularly polarized light has a medium value between 90° and 180° which are linear polarization axes, and may vibrate with all phases of the x-axis and the y-axis, that is, 90° and 180°. The circularly polarized light may not be placed on a specific axis, and may change the axis while equally vibrating. According to an embodiment, the retardation layer may have a characteristic of a quarter wave retarder (λ/4 retarder).

According to an embodiment, when light of the sun enters the panel, at least a portion of the light may be reflected from an electrode included in the panel, which may make it difficult to recognize a screen. The polarizing layer and the retardation layer of the optical layer 650 may prevent light entering from the outside from being reflected and going out, thereby enhancing outdoor visibility. For example, the 135° circularly polarized light which is changed by the retardation layer may be reflected by the TFT 620, and the reflected 135° circularly polarized light may be changed to the 180° linearly polarized light by passing through the retardation layer, and the 180° linearly polarized light may not be discharged to the outside through the 90° polarizing layer. According to a certain embodiment, one layer in which the polarizing layer and the retardation layer are combined may be provided, and this layer may be defined as a "circular polarization layer."

According to an embodiment, the panel may further include the flexible window 660 disposed on the optical layer 650. According to an embodiment, the flexible window 660 may include a polyimide (PI) window. According to an embodiment, the flexible window 660 may have a weaker strength than a glass window to have a bending characteristic.

According to an embodiment, the panel may further include various layers (not shown). For example, the panel may include a buffer layer disposed between the TFT 620 and the first substrate 610 and formed with silicon oxide, silicon nitride, or the like. For example, the panel may include a protection layer disposed between the buffer layer and the first substrate 610 and formed with polymer or the like.

According to an embodiment, the flexible display 509 may include various displays based on the TFT 620, and for example, may be an active matrix organic light emitting diode (AMOLED) display, a passive matrix organic light emitting diode (PMOLED) display, or a liquid crystal display (LCD). According to an embodiment, the display may be formed on a flexible substrate (for example, a substrate formed with polyimide (PI)).

According to an embodiment, the third processor 508 may control the TFT 620 electrically connected with the light emission layer 630 including the plurality of pixels.

In an embodiment, the first processor 501 may obtain data from the touch sensor 502, the force touch sensor 503, or the configuration detection sensor 504 while the second processor 505 is in a sleep state, and may process the data. In an embodiment, the sleep state may refer to a turn off state in which booting is executed to switch into the wake-up state. In an embodiment, the sleep state may refer to a state in which a power management integrated circuitry (PMIC) (not shown) (for example, the power management module 188) of the electronic device 101 has a limit to (for example, stops) providing power to the second processor 505. In an embodiment, the sleep state may refer to a state in which the second processor 505 does not utilize booting to switch into an active state, but utilizes obtaining normal power from the PMIC. In an embodiment, the sleep state may refer to a state in which power lower than reference power is obtained from the PMIC of the electronic device 101. In an embodiment, the sleep state may include one or more of an inactive state, an idle state, a standby state, or a low power state.

In an embodiment, the first processor 501 may detect an external object contacting the first area or the second area (for example, the first area or second area defined through the description of FIG. 3) through the touch sensor 502 while the second processor 505 is in the sleep state. In an embodiment, the third processor 508 may operate in an always on display (AOD) mode while the second processor 505 is in the sleep state. In an embodiment, the AOD mode may refer to a mode in which the second processor 505 is in the sleep state during at least a part of a period during which a screen is displayed through the flexible display 509. In an embodiment, the AOD mode may refer to a mode in which power is obtained from an internal power source of the third processor 508. In an embodiment, the AOD mode may be referred to as a self-display mode in terms of the feature of displaying a screen according to an operation of the third processor 508 itself. In an embodiment, the AOD mode may include a plurality of sub modes. For example, the AOD mode may include an AOD self-animation mode. The AOD self-animation mode may refer to a mode in which the third processor 508 provides an animation through the flexible display 509 by scanning a plurality of images included in frame data stored in an internal memory in the third processor 508 in sequence while the second processor 505 is in the sleep state. For example, the AOD mode may include an AOD non-self-animation mode. The AOD non-self-animation mode may refer to a mode in which, when an event is detected during the AOD mode, an animation is provided by using frame data provided from the second processor 505 in every frame based on the detected event.

In an embodiment, the first processor 501 may detect the external object contacting the first area or the second area through the touch sensor 502 while the second processor 505 is in the sleep state and the third processor 508 provides the AOD mode.

In an embodiment, the first processor 501 may obtain data indicating a change of a capacitance caused by the external object contacting the first area or the second area by using the touch sensor 502.

In an embodiment, the first processor 501 may identify an intensity of the external object depressing the first area, the second area, or the first area and the second area by using the force touch sensor 503 while the second processor 505 is in the sleep state.

In an embodiment, the processor 501 may identify an intensity of the external object depressing the first area, the second area, or the first area and the second area by using the force touch sensor 503, while the second processor 505 is in the sleep state and the third processor 508 provides the AOD mode.

In an embodiment, the first processor 501 may request the second processor 505 to change the state of the second processor 505 to the active state, based on data obtained by using the touch sensor, data obtained by using the force touch sensor 503, or a combination thereof. For example, the first processor 501 may request the second processor 505 to change the state of the second processor 505 to the active state, based at least on data indicating a change of a capacitance caused by the external object contacting the first area or the second area. In another example, in response to it being identified that the intensity of the external object depressing the first area, the second area, or the first area and the second area is greater than a reference intensity, the first processor 501 may request the second processor 505 to change the state of the second processor 505 to the active state. In an embodiment, the reference intensity may be configured in the electronic device 101 to identify whether there is a possibility that the flexible display 509 may be damaged by depression of the external object. In an embodiment, the reference intensity may be configured differently according to a strength of the flexible window 660 of the flexible display 509. In an embodiment, the reference intensity may be changed adaptively according to a state of the electronic device 101 (for example, the first state or the second state defined through the description of FIG. 3 or 4). The state of the electronic device 101 (or the configuration of the electronic device 101) will be described in detail below with reference to FIG. 7. In still another example, the first processor 501 may request the second processor 505 to change the state of the second processor 505 to the active state, based at least on the data indicating the change of the capacitance caused by the external object contacting the first area or the second area, and another data indicating the intensity of the external object contacting the first area or the second area and depressing the first area or the second area. For example, the first processor 501 may determine whether the intensity is greater than the reference intensity, based on the other data obtained by the force touch sensor 503, while it is identified that the contact of the external object is held through the touch sensor 502.

In an embodiment, the first processor 501 may request the PMIC (not shown) instead of the second processor 505 to change the state of the second processor 505 to the active state. The PMIC which receives the request from the first processor 501 may change the state of the second processor 505 from the sleep state to the active state by providing normal power to the second processor 505.

In an embodiment, the first processor 501 may request the second processor 505 to provide a designated notification along with the request. For example, the first processor 501 may request the second processor 505 to provide the designated notification in order to notify a subsequent operation to be performed by the second processor 505 after the second processor 505 is changed to the active state. In an embodiment, the designated notification may be configured to notify that there is a possibility that the flexible display 509 may be damaged. In an embodiment, the designated notification may be configured to guide the user to take caution to avoid a damage of the flexible display 509. However, this should not be considered as limiting.

In an embodiment, the first processor 501 may identify whether caution should be taken to avoid a damage of the flexible display 509 by using data obtained by the configuration detection sensor 504, in addition to the data obtained by the touch sensor 502 and the another data obtained by the force touch sensor.

For example, the electronic device 101 may have various configurations since the electronic device 101 is foldable.

Figure 7:
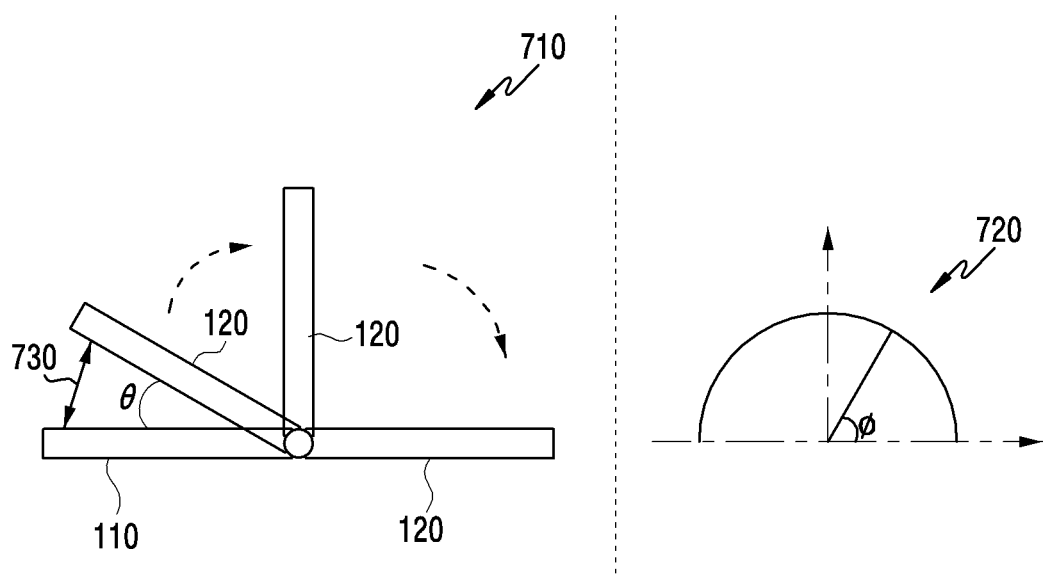
FIG. 7 is a view illustrating an example of a configuration of an electronic device according to an embodiment.

For example, referring to FIG. 7, since the first housing 310 and the second housing 320 are rotatably coupled with each other through the folding part 330 as seen in state 710, the electronic device 101 may have various configurations, according to an angle between the first housing 310 and the second housing 320. The angle between the first housing 310 and the second housing 320 may be identified based on data obtained through the configuration detection sensor 504. For example, the configuration detection sensor 504 may include an angle measurement sensor included in the folding part 330, a magnetic sensor disposed in each of the first housing 310 and the second housing 320, a gyro sensor disposed in each of the first housing 310 and the second housing 320, an acceleration sensor disposed in each of the first housing 310 and the second housing 320, a proximity sensor disposed in each of the first housing 310 and the second housing 320, or a combination thereof. For example, the angle between the first housing 310 and the second housing 320 may be defined as shown in a graph 720. In an embodiment, the first state may refer to a state in which the angle θ between the first housing 310 and the second housing 320 is outside of a designated range (for example, a range from Ø degrees to 180 degrees). For example, the first state may refer to a state in which there is a possibility that the external object of the flexible display 509 is inserted into a space 730 between the first area and the second area. In various embodiment, the second state may refer to a state in which the angle θ between the first housing 310 and the second housing 320 is within a designated range (for example, a range from 0 degree to Ø degrees in the graph 720). For example, the second state may refer to a state in which there is no possibility or a low possibility that the external objects of the flexible display 509 is inserted into the space 730 between the first area and the second area. In an embodiment, the first state and the second state may be divided by a distance instead of the angle as shown in the example of FIG. 7. For example, the first state may be defined as a state in which a distance between a first side of the first area and a second side of the second area facing the first side is longer than a designated distance, and the second state may be defined as a state in which the distance between the first side of the first area and the second side of the second area is shorter than or equal to the designated distance. However, this should not be considered as limiting. In an embodiment, the first state may be referred to as a first configuration since the first state may be related to a configuration of the electronic device 101, and the second state may be referred to as a second configuration since the second state may be related to a configuration of the electronic device 101.

In an embodiment, the first processor 501 may determine whether to change the state of the second processor 505 to the active state, based on data obtained by the touch sensor 502, the force touch sensor 503, or a combination thereof, while the electronic device 101 is in the first configuration. In an embodiment, the first processor 501 may stop or finish obtaining data by using the touch sensor 502, the force touch sensor 503, or a combination thereof, while the electronic device 101 is in the second configuration. For example, since there is no possibility or a low possibility that the external object contacts the first area or the second area of the flexible display 509 while the electronic device 101 is in the second configuration, the first processor 501 may stop or finish obtaining data by using the touch sensor 502, the force touch sensor 503, or a combination thereof. For example, while the electronic device 101 is in the second configuration, the touch sensor 502, the force touch sensor 503, or a combination thereof may be inactivated. On the other hand, while the electronic device 101 is in the second configuration, the touch sensor 502, the force touch sensor 503, or a combination thereof may be activated. In an embodiment, an operating frequency of the touch sensor 502 or an operating frequency of the force touch sensor 503 while the second processor 505 is in the sleep state may be lower than an operating frequency of the touch sensor 502 or an operating frequency of the force touch sensor 503 while the second processor 505 is in the active state.

Figure 8:
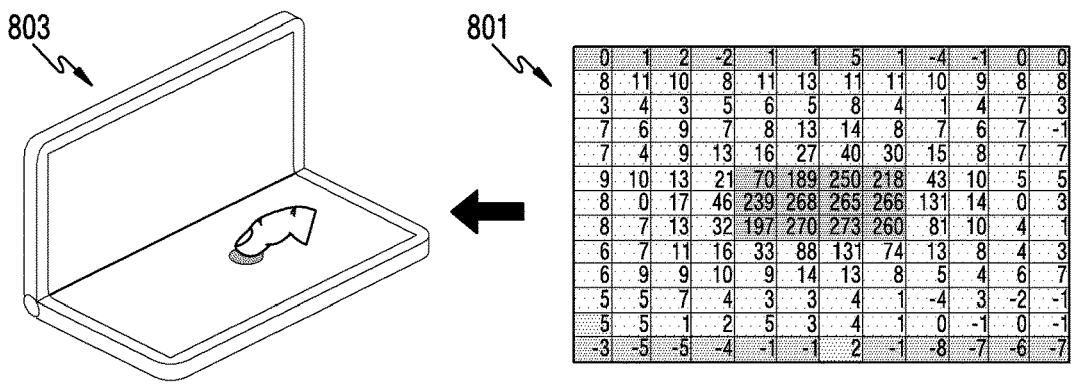
FIG. 8 is a view illustrating an example of an electronic device which recognizes an external object according to a distribution of data obtained by a touch sensor according to an embodiment.
Figure 8:
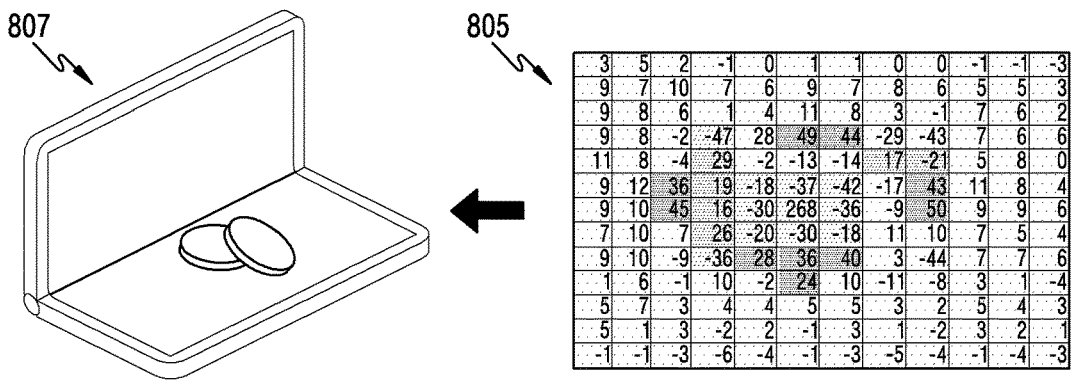
Figure 8:
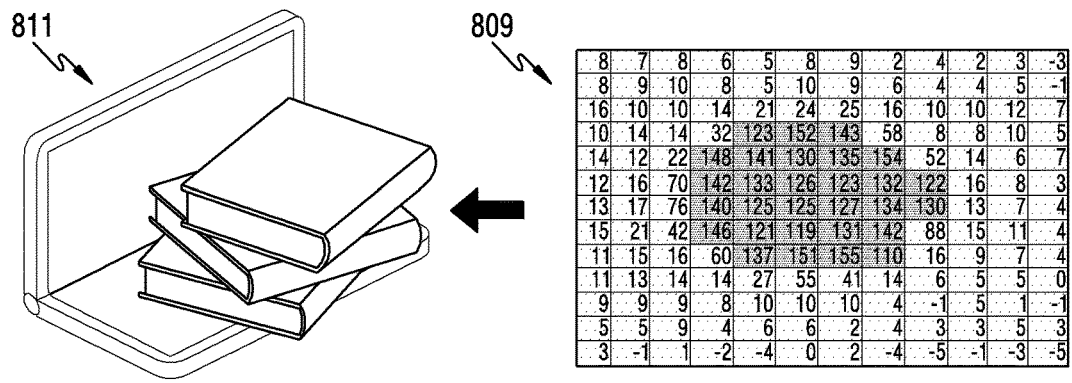

In an embodiment, the first processor 501 may identify whether the external object is an input means, based on a distribution of data which is obtained by the touch sensor 502 and indicates a change of a capacitance caused by the contact of the external object on the flexible display 509. For example, referring to FIG. 8, the first processor 501 may obtain a distribution 801 of data indicating a change of a capacitance caused by the contact of the external object on the flexible display 509, by using the touch sensor 502. In an embodiment, the first processor 501 may recognize that the input object or input means (such as, for example, a finger) contacts the flexible display 509 as in a state 803, based on the distribution 801. In another example, the first processor 501 may obtain a distribution 805 of data indicating a change of a capacitance caused by the contact of the external object on the flexible display 509 by using the touch sensor 502. In an embodiment, the first processor 501 may recognize that a metallic object (such as, for example, a coin) which is different from the known input object or means contacts the flexible display 509 as in a state 807, based on the distribution 805. In still another example, the processor 501 may obtain a distribution 809 of data indicating a change of a capacitance caused by the contact of the external object on the flexible display 509 by using the touch sensor 502. In an embodiment, the first processor 501 may recognize that a heavy nonconductive object different from the input means contacts the flexible display 509 as in a state 811, based on the distribution 809.

In an embodiment, the second processor 505 may change the state of the second processor 505 to the active state in response to the request from the first processor 501. For example, in response to the request from the first processor 501, the second processor 505 may change the state of the second processor 505 from the sleep state to the active state in order to provide the designated notification to inform about a damage of the flexible display 509. In an embodiment, the second processor 505 may provide the designated notification which is configured as a haptic effect by using the haptic module 506. For example, the haptic effect may have a pattern to inform that the user should take caution to avoid a damage of the flexible display 509. In an embodiment, the second processor 505 may provide the designated notification which is configured with an audio signal to inform that the user should take caution to avoid a damage of the flexible display 509, by using the speaker 507. For example, the audio signal may be configured with a voice signal, or may be configured with a beat note outputting designated sounds repeatedly. However, this should not be considered as limiting.

As described above, the electronic device 101 according to an embodiment may identify whether the external object contacts the flexible display 509 and the flexible display 509 may be damaged by the external object, by using the touch sensor 502, the force touch sensor 503, the configuration detection sensor 504, or a combination thereof. The electronic device 101 according to an embodiment may provide the designated notification, based on it being identified that the flexible display 509 may be damaged by the external object. The electronic device 101 according to an embodiment can prevent a damage of the flexible display 509 by providing the designated notification.

As described above, an electronic device according to an embodiment may include: a first housing including a first surface and a second surface facing away from the first surface; a second housing including a third surface and a fourth surface facing away from the third surface; a folding part configured to pivotably couple a side surface of the first housing and a side surface of the second housing facing the side surface of the first housing; a flexible display disposed on the first surface and the third surface across the folding part, and including a first area corresponding to the first surface and a second area corresponding to the third surface;

a touch sensor configured to detect a touch input on the first area and the second area; a first processor operatively coupled with the touch sensor; and a second processor operatively coupled with the flexible display and the first processor. The first processor may be configured to detect an external object contacting the first area or the second area through the touch sensor while the second processor is in a sleep state, to obtain data indicating a change of a capacitance caused by the external object contacting the first area or the second area, and to request the second processor to change a state of the second processor to an active state based at least on the data. The second processor may be configured to change the state of the second processor to the active state in response to the request from the first processor, and to provide a designated notification in response to the change.

In an embodiment, the electronic device may further include a force touch sensor operatively coupled with the first processor and configured to obtain data regarding an intensity of depression of a touch input, and the first processor may be configured to obtain another data indicating an intensity of the external object depressing the first area or the second area through the force touch sensor while the second processor is in the sleep state, and to request to change the state of the second processor to the active state based on the data and the another data. In an embodiment, the first processor may be configured to identify whether the intensity is greater than a reference intensity based on the another data, while identifying that the contact of the external object is held by using the touch sensor, and, in response to it being identified that the intensity is greater than the reference intensity, to request to change the state of the second processor to the active state.

In an embodiment, the electronic device may further include a configuration detection sensor configured to obtain data regarding a configuration of the electronic device, and the touch sensor may be activated based on it being identified that a distance between a first side of the first area and a second side of the second area facing the first side is longer than a designated distance, while the second processor is in the sleep state. In an embodiment, the touch sensor may be inactivated based on it being identified that the distance between the first side and the second side is shorter than or equal to the designated distance while the second processor is in the sleep state.

In an embodiment, an operating frequency of the touch sensor while the second processor is in the sleep state may be shorter than an operating frequency of the touch sensor while the second processor is in the active state.

In an embodiment, the first processor may be configured to identify that the external object is an object distinct from an input means, based on a distribution of the data on the first area or the second area, and to request to change the state of the second processor to the active state based on the identification.

In an embodiment, the electronic device may further include a haptic module operatively coupled with the second processor, and the designated notification may correspond to a haptic effect having a designated pattern.

In an embodiment, the electronic device may further include a speaker operatively coupled with the second processor, and the second processor may be configured to provide the designated notification which is configured with an audio signal for guiding to take caution to avoid a damage of the flexible display through the speaker, in response to the change.

In an embodiment, the flexible display may include a polyimide (PI) window exposed to an outside.

As described above, an electronic device described above may include: a first housing including a first surface and a second surface facing away from the first surface; a second housing including a third surface and a fourth surface facing away from the third surface; a folding part configured to pivotably couple a side surface of the first housing and a side surface of the second housing facing the side surface of the first housing; a flexible display disposed on the first surface and the third surface across the folding part, and including a first area corresponding to the first surface and a second area corresponding to the third surface; a force touch sensor configured to detect an intensity of depression of a touch input on the first area and the second area; a first processor operatively coupled with the touch sensor; and a second processor operatively coupled with the flexible display and the first processor, and the first processor may be configured to identify an intensity of an external object depressing the first area, the second area, or the first area and the second area through the force touch sensor while the second processor is in a sleep state, and, in response to it being identified that the identified intensity is greater than a reference intensity, to request the second processor to change a state of the second processor to an active state, and the second processor may be configured to change the state of the second processor to the active state in response to the request from the first processor, and to provide a designated notification in response to the change.

Figure 9:
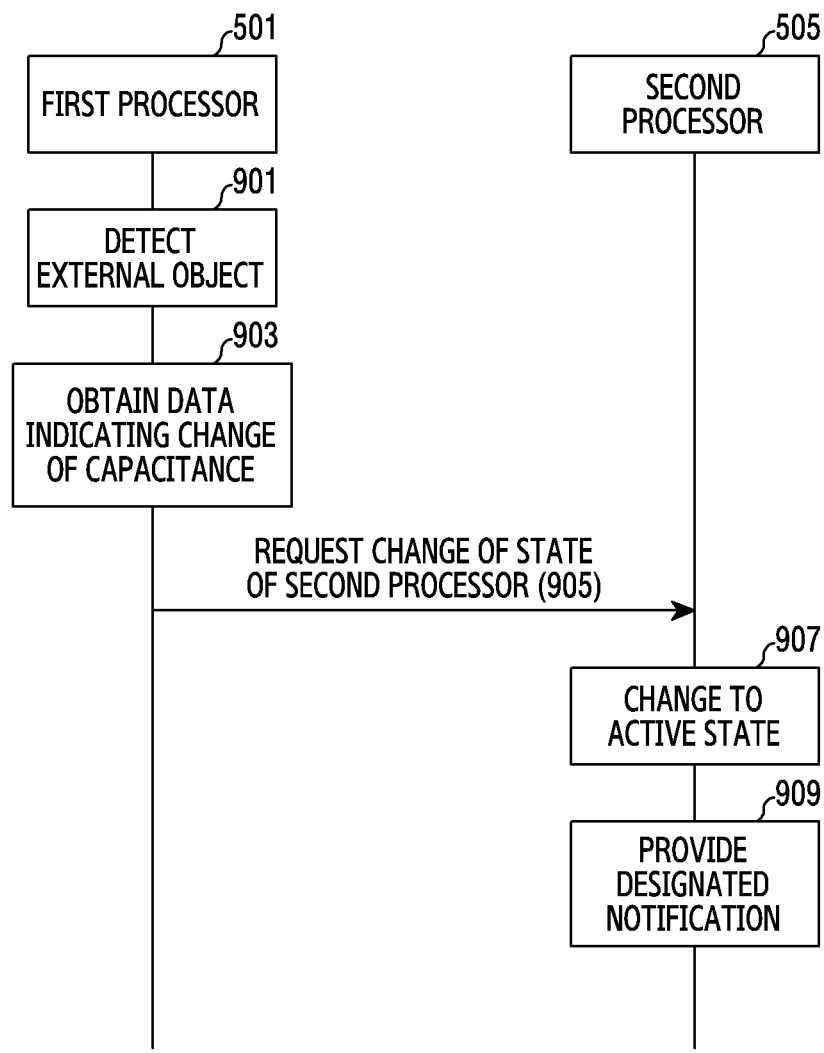
FIG. 9 is a view illustrating an example of an operation of an electronic device according to an embodiment.

FIG. 9 illustrates an example of an operation of an electronic device according to an embodiment. The operation may be performed by the electronic device 101 shown in FIG. 1, the electronic device 101 shown in FIG. 3, the electronic device 101 shown in FIG. 4, or the first processor 501 and the second processor 505 shown in FIG. 5.

Referring to FIG. 9, in operation 901, the first processor 501 may detect an external object contacting the first area or the second area of the flexible display 509 through the touch sensor 502, while the second processor 505 is in the sleep state. The first area and the second area may be the first area and the second area defined through the description of FIG. 3, or the first area and the second area defined through the description of FIG. 4. In an embodiment, an operating frequency of the touch sensor 502 while the second processor 505 is in the sleep state may be lower than an operating frequency of the touch sensor 502 while the second processor 505 is in the active state. For example, the electronic device 101 according to an embodiment may set the operating frequency of the touch sensor 502 to an operating frequency lower than a normal operating frequency while the second processor 505 is in the sleep state, in order to reduce power consumption while the second processor 505 is in the sleep state.

In an embodiment, since the second processor 505 being in the sleep state may indicate that the electronic device 101 is not presently being actively used by a user, the user may not be attentive to the device and may accidentally close the device 101 while the foreign object is present, damaging the display. In order to prevent the flexible display 509 from being damaged, the electronic device 101 according to an embodiment may monitor the flexible display 509 to detect whether any external objects contacts the flexible display 509, using the touch sensor 502 while the second processor 505 operates in the sleep state.

In operation 903, the first processor 501 may receive data indicating a change of a capacitance caused by the external object contacting the first area or the second area of the flexible display. For example, the first processor 501 may receive the data indicating a change of a "self" capacitance caused by the external object contacting the first area or the second area, as detected the touch sensor 502. In another example, the first processor 501 may obtain the data indicating a change of a mutual capacitance caused by the external object contacting the first area or the second area, using the touch sensor 502.

In operation 905, the first processor 501 may request the second processor 505 to change an operational state of the second processor 505 from a "sleep" state to an activated state, based at least on the data. For example, the first processor 501 may detect that a non-intended external object is disposed on the flexible display 509, based at least on the data. For example, the first processor 501 may identify a characteristic of the external object, based at least on the data, and may identify that the external object is another object distinct from a known input object or means, based on the identified characteristic. The first processor 501 may request the second processor 505 to change the state of the second processor 505 to the active state based on the identification. The second processor 505 may receive the request from the first processor 501.

In operation 907, the second processor 505 may change the state of the second processor 505 from the sleep state to the active state in response to the request.

In operation 909, the second processor 505 may provide a designated notification in response to the change to the active state. For example, the second processor 505 may provide a haptic effect using the haptic module 506 to notify the user that the flexible display 509 may be damaged if closed while the foreign object is disposed thereon. In another example, the second processor 505 may output an audio signal by using the speaker 507 in order to inform that the flexible display 509 may be damaged. In an embodiment, the audio signal may be configured with a voice signal. In an embodiment, the audio signal may be a signal that is selectable based on a user input, such as an alarming sound. However, this should not be considered as limiting.

As described above, the electronic device 101 according to an embodiment may detect whether an external object exists on the flexible display 509 by using the touch sensor 502 operatively coupled with the first processor 501 while the second processor 505 is in the sleep state, and may change the state of the second processor 505 based on the detection, such that the flexible display 509 can be prevented from being damaged.

Figure 10:
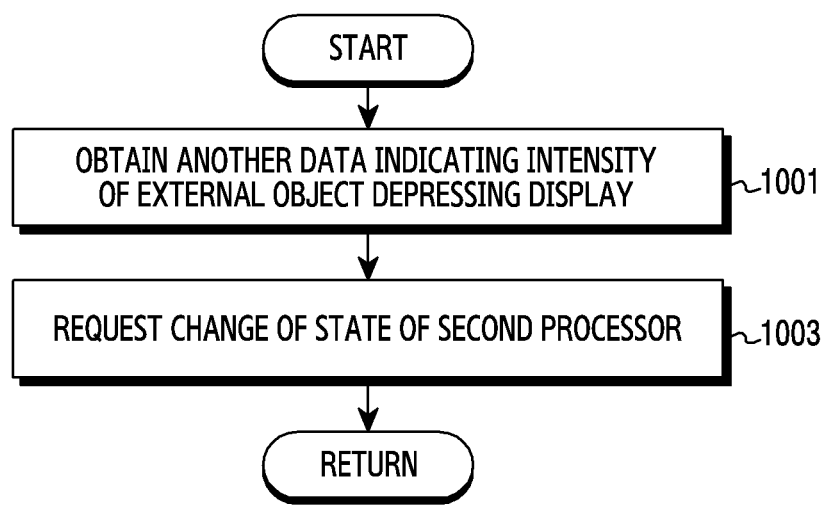
FIG. 10 is a view illustrating an example of an operation of a first processor which requests a change of a state of a second processor according to an embodiment.

FIG. 10 illustrates an example of an operation of a first processor requesting change of a state of a second processor according to an embodiment. The operation may be performed by the first processor 501 shown in FIG. 5.

Operations 1001 and 1003 of FIG. 10 may be related to operation 905 of FIG. 9.

Referring to FIG. 10, in operation 1001, the first processor 501 may obtain another data indicating a pressure intensity of the external object on the flexible display 509 using the force touch sensor 503. For example, the first processor 501 may obtain the another data indicating the pressure intensity of the external object depressing the first area or the second area through the force touch sensor 503, while obtaining the data indicating the change of the capacitance caused by the external object contacting the first area or the second area through the touch sensor 502. By comparison against a threshold pressure intensity, the device 101 may detect that there is a possibility that the flexible display 509 will be by the presence of the foreign object on the flexible display 509, especially when the device 101 is being closed. Therefore, the first processor 501 may obtain the another data indicating the intensity of the external object depressing the flexible display 509 by using the force touch sensor 503 in addition to the touch sensor 502.

In operation 1003, the first processor 501 may request the second processor 505 to change the state of the second processor 505 based at least on the data and the other data. For example, the first processor 501 may determine that there is a high possibility that the flexible display 509 may be damaged when the external object is another object distinct from an input means and an additional pressure is applied to the flexible display 509, based at least on the data and the another data. The first processor 501 may request the second processor 505 to change the state of the second processor 505, based on the determination, in order to provide the designated notification warning of the potential damage.

As described above, the electronic device 101 according to an embodiment may identify whether there is a possibility that the external object contacting the flexible display 509 may damage the flexible display 509, by using the force touch sensor 503 in addition to the touch sensor 502, such that the flexible display 509 can be prevented from being damaged by a pressure.

Figure 11:
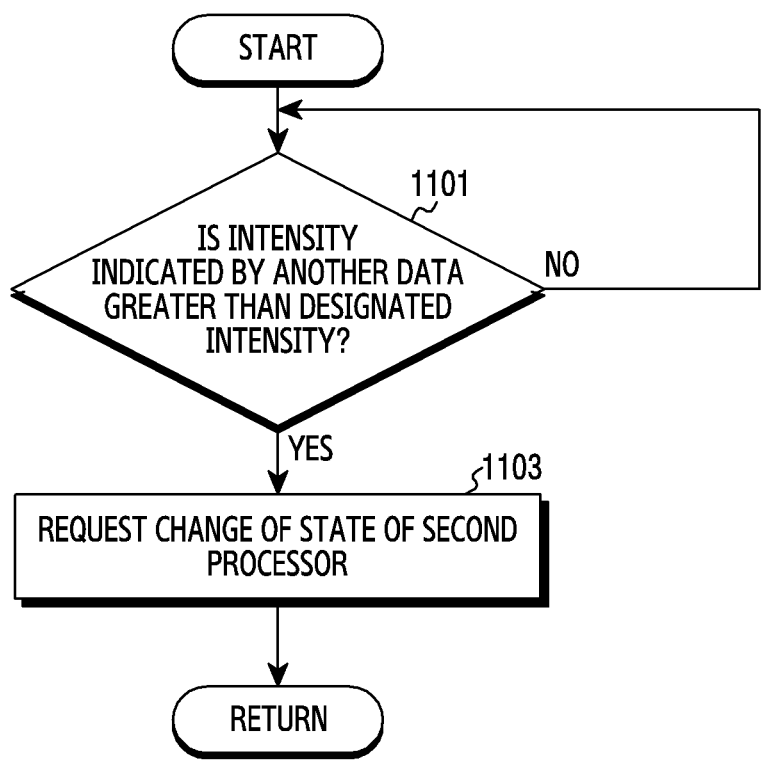
FIG. 11 is a view illustrating an example of an operation of a first processor which requests a change of a state of a second processor based on an intensity of an external object depressing according to an embodiment.

FIG. 11 illustrates an example of an operation of a first processor which requests change of a state of a second processor, based on an intensity of an external object depressing according to an embodiment. The operation may be performed by the first processor 501 shown in FIG. 5.

Operations 1101 and 1103 of FIG. 11 may be related to operation 1003 of FIG. 10.

Referring to FIG. 11, in operation 1101, the first processor 501 may identify whether an intensity indicated by the other data obtained in operation 1001 of FIG. 10 is greater than a designated intensity. In an embodiment, the designated intensity may be set differently according to an area of the flexible display 509. For example, the designated intensity configured for a center area of the flexible display 509 may be smaller than the designated intensity configured for an edge area of the flexible display 509. This is because the center area of the flexible display 509 is more likely to be damaged by an external pressure than the edge area of the flexible display 509. When the designated intensity is set differently according to an area of the flexible display 509, the first processor 501 may recognize a position of the external object within the flexible display 509 by using the touch sensor 502, and may compare the designated intensity corresponding to the recognized position and the intensity indicated by the another data. In an embodiment, when the intensity indicated by the another data is smaller than or equal to the designated intensity, the first processor 501 may continuously identify the intensity of the external object depressing the flexible display 509 while the second processor 505 is maintained in the sleep state, and may continuously compare the intensity and the designated intensity. On the other hand, when the intensity indicated by the other data is greater than the designated intensity, the first processor 501 may perform operation 1103.

In operation 1103, the first processor 501 may request the second processor 505 to change the state of the second processor 505, based on it being identified that the intensity is greater than the designated intensity.

Figure 12:
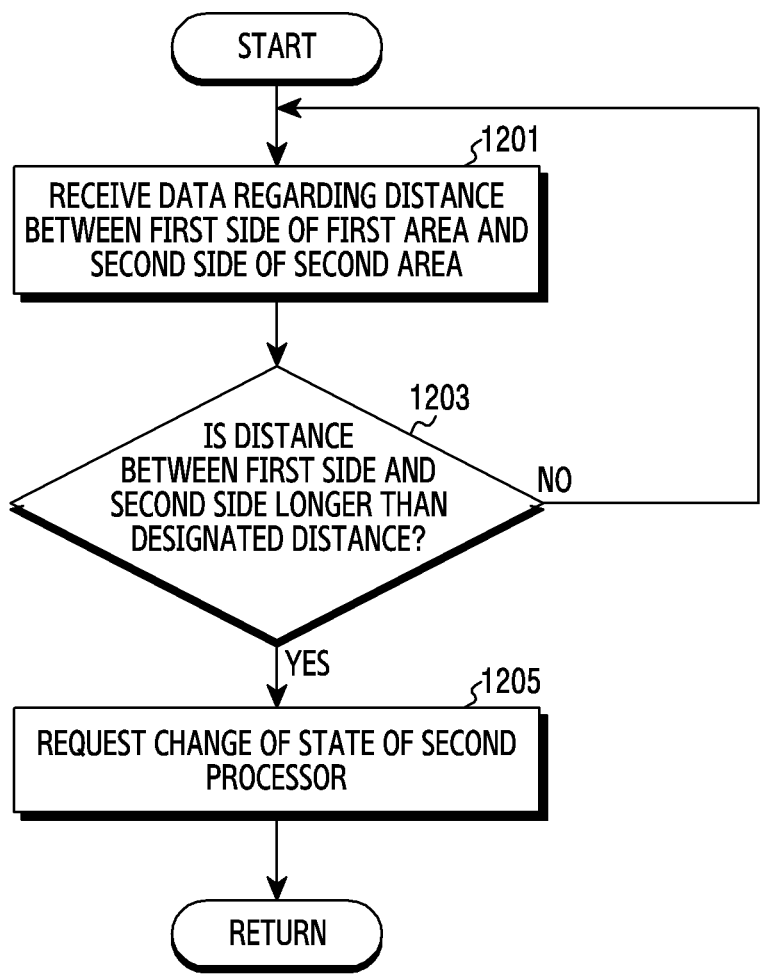
FIG. 12 is a view illustrating an example of a first processor which requests a change of a state of a second processor, based on a configuration of an electronic device according to an embodiment.

FIG. 12 illustrates an example of an operation of a first processor which requests change of a state of a second processor based on a configuration of an electronic device according to an embodiment. The operation may be performed by the first processor 501 shown in FIG. 5.

Operations 1201 to 1205 of FIG. 12 may be related to operation 905 of FIG. 9, operation 1003 of FIG. 10, or operation 1103 of FIG. 11.

Referring to FIG. 12, in operation 1201, the first processor 501 may receive data indicating a distance between the first side of the first area of the flexible display 509 and the second side of the second area of the flexible display 509 facing the first side, by using the configuration detection sensor 504.

In operation 1203, the first processor 501 may identify whether the distance between the first side and the second side is longer than a designated threshold distance. The distance between the first side and the second side being longer than the designated threshold distance may mean that there is a high possibility that the external object is inserted into a space between the first side and the second side. In an embodiment, based on it being identified that the distance between the first side and the second side is shorter than or equal to the designated distance, the first processor 501 may continue receiving the data from the configuration detection sensor 504 while the second processor 505 is maintained in the sleep state. In an embodiment, the first processor 501 may perform operation 1205 based on it being identified that the distance between the first side and the second side is longer than the designated distance.

In operation 1205, based on it being identified that the distance between the first side and the second side is longer than the designated threshold distance, the first processor 501 may request the second processor 505 to change the state of the second processor 505.

FIG. 12 illustrates an example in which the first processor 501 requests the second processor 505 to change the state of the second processor 505 when the distance between the first side and the second side is long, but alternatives may be applied to the disclosure.

For example, when the distance between the first side and the second side is shorter than the designated distance, the first processor 501 may set states of the touch sensor 502 and the force touch sensor 503 to the inactive state. Since the distance between the first side and the second side being shorter than the designated distance means that there is no possibility or a low possibility that the external object is inserted into the space between the first area and the second area, the first processor 501 may set the states of the touch sensor 502 and the force touch sensor 503 to the inactive state. While the touch sensor 502 and the force touch sensors 503 are in the inactive state and the second processor 505 is in the sleep state, the first processor 501 can prevent the flexible display 509 from being damaged by an external object, by continuously identifying whether the distance between the first side and the second side is longer than the designated distance by using the configuration detection sensor 504.

In another example, based on it being identified that the external object contacts the flexible display 509, the first processor 501 may identify whether the distance between the first side and the second side becomes shorter. The distance between the first side and the second side becoming shorter may mean that the probability that the external object contacting the flexible display 509 applies a pressure to the flexible display 509 increases. Therefore, the first processor 501 may identify whether the distance between the first side and the second side becomes shorter. The first processor 501 may request the second processor 505 to change the state of the second processor 505 based on it being identified that the distance between the first side and the second side becomes shorter.

Figure 13:
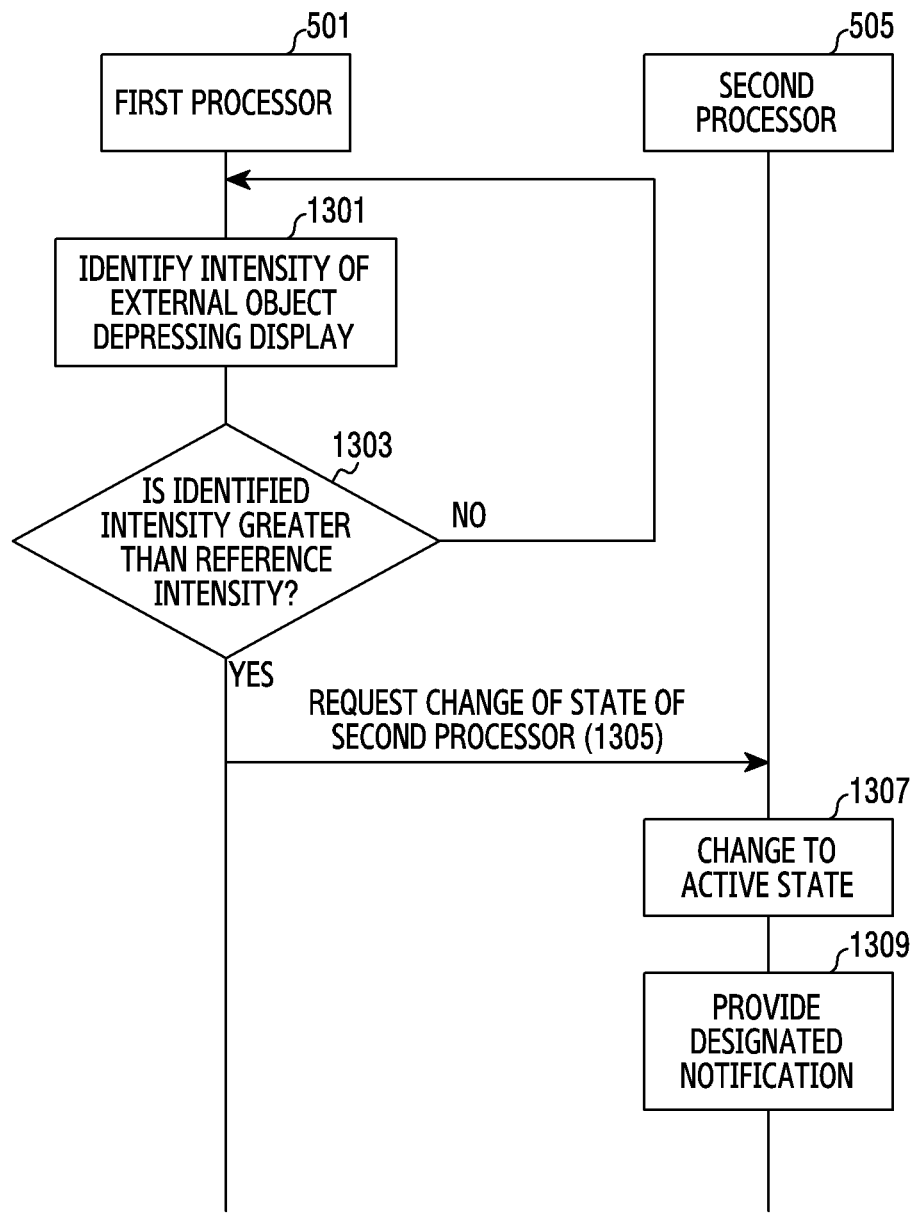
FIG. 13 is a view illustrating another example of an operation of an electronic device according to an embodiment.

FIG. 13 illustrates another example of an operation of an electronic device according to an embodiment. The operation may be performed by the electronic device 101 shown in FIG. 1, the electronic device 101 shown in FIG. 3, the electronic device 101 shown in FIG. 4, or the first processor 501 and the second processor 505 shown in FIG. 5.

Referring to FIG. 13, in operation 1301, the first processor 501 may identify an intensity of an external object depressing the flexible display 509 by using the force touch sensor 503 while the second processor 505 is in the sleep state.

In operation 1303, the first processor 501 may identify whether the identified intensity is greater than a reference intensity. For example, the first processor 501 may identify whether the identified intensity is greater than the reference intensity to identify whether there is a possibility that the external object may damage the flexible display 509. Based on it being identified that the identified intensity is greater than the reference intensity, the first processor 501 may perform operation 1305. On the other hand, based on it being identified that the identified intensity is smaller than or equal to the reference intensity, the first processor 501 may continue identifying the intensity of the external object depressing the flexible display 509 while the second processor 505 is in the sleep state, and may continue comparing the intensity and the reference intensity.

In operation 1305, based on it being identified that the identified intensity is greater than the reference intensity, the first processor 501 may request the second processor 505 to change the state of the second processor 505. The second processor 505 may receive the request.

In operation 1307, the second processor 505 may change the state of the second processor 505 to the active state. For example, the second processor 505 may change the state of the second processor 505 to the active state in order to provide a designated notification.

In operation 1309, in response to the change to the active state, the second processor 505 may provide the designated notification. For example, the second processor 505 may provide the designated notification by using the haptic module 506, the speaker 507, or a combination thereof.

As described above, the electronic device 101 according to an embodiment can prevent the flexible display 509 from being damaged by a non-intended pressure, by checking the possibility that the flexible display 509 is damaged by using the first processor 501 operating while the second processor 505 is in the sleep state and the force touch sensor 503 operatively coupled with the first processor 501.

According to an embodiment as described above, a method for operating an electronic device, which includes a first housing including a first surface and a second surface facing away from the first surface; a second housing including a third surface and a fourth surface facing away from the third surface; and a folding part configured to pivotably couple a side surface of the first housing and a side surface of the second housing facing the side surface of the first housing may include: detecting, by a first processor of the electronic device, an external object contacting a first area of a flexible display corresponding to the first surface or a second area corresponding to the third surface, by using a touch sensor of the electronic device, while a second processor of the electronic device is in a sleep state, the flexible display being disposed on the first surface and the third surface across the folding part; obtaining, by the first processor of the electronic device, data indicating a change of a capacitance caused by the external object contacting the first area or the second area; requesting, by the first processor, the second processor to change a state of the second processor to an active state based at least on the data; changing, by the second processor, the state of the second processor to the active state in response to the request from the first processor; and providing, by the second processor, a designated notification in response to the change.

In an embodiment, requesting to change the state of the second processor to the active state may include: obtaining, by the first processor, another data indicating an intensity of the external object depressing the first area or the second area through a force touch sensor of the electronic device while the second processor is in the sleep state; and requesting, by the first processors, to change the state of the second processor to the active state based on the data and the another data. In an embodiment, requesting to change the state of the second processor to the active state may include: identifying, by the first processor, whether the intensity is greater than a reference intensity based on the another data, while identifying that the contact of the external object is held by using the touch sensor; and, in response to it being identified that the intensity is greater than the reference intensity, requesting, by the first processor, to change the state of the second processor to the active state.

In an embodiment, the touch sensor may be activated based on it being identified that a distance between a first side of the first area and a second side of the second area facing the first side is longer than a designated distance by using a configuration detection sensor of the electronic device, while the second processor is in the sleep state.

In an embodiment, the touch sensor may be inactivated based on it being identified that the distance between the first side and the second side is shorter than or equal to the designated distance by using the configuration detection sensor, while the second processor is in the sleep state.

In an embodiment, an operating frequency of the touch sensor while the second processor is in the sleep state may be shorter than an operating frequency of the touch sensor while the second processor is in the active state.

In an embodiment, requesting to change the state of the second processor to the active state may include: identifying, by the first processor, that the external object is an object distinct from an input means, based on a distribution of the data on the first area or the second area; and requesting, by the first processor, to change the state of the second processor to the active state based on the identification.

In an embodiment, the designated notification may correspond to a haptic effect having a designated pattern.

In an embodiment, the designated notification may be configured with an audio signal for guiding to take caution to avoid a damage of the flexible display, and may be outputted through a speaker of the electronic device.

According to an embodiment as described above, a method for operating an electronic device, which includes a first housing including a first surface and a second surface facing away from the first surface; a second housing including a third surface and a fourth surface facing away from the third surface; and a folding part configured to pivotably couple a side surface of the first housing and a side surface of the second housing facing the side surface of the first housing may include: identifying, by a first processor of the electronic device, an intensity of an external object depressing a first area of a flexible display corresponding to the first surface or a second area corresponding to the third surface, by using a force touch sensor of the electronic device, while a second processor of the electronic device is in a sleep state, the flexible display being disposed on the first surface and the third surface across the folding part; in response to it being identified that the identified intensity is greater than a reference intensity, requesting, by the first processor, the second processor to change a state of the second processor to an active state; changing, by the second processor, the state of the second processor to the active state in response to the request from the first processor; and providing, by the second processor, a designated notification in response to the change.

The electronic device and the method thereof according to certain embodiments can prevent a damage of the flexible display of the electronic device by providing a designated notification based on data obtained by the configuration detection sensor, the touch sensor, the force touch sensor, or a combination thereof.

The effect achieved by the disclosure is not limited to those mentioned above, and other effects that are not mentioned above may be clearly understood to those skilled in the art based on the description provided above.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to certain optional embodiments thereof, it will be understood by those skilled in the art that various changes in form and details may be made therein without departing from the disclosure as defined by the appended claims. Therefore, the disclosure is defined not by the detailed description of the disclosure but by the appended claims, and all differences will be construed as being included in the disclosure.

What is claimed is:

1. An electronic device, comprising:
a first housing including a first surface and a second surface facing away from the first surface;
a second housing including a third surface and a fourth surface facing away from the third surface;
a folding part configured to pivotably couple a side surface of the first housing and a side surface of the second housing;
a flexible display disposed on the first surface and the third surface, the flexible display covering the folding part, and including a first area corresponding to the first surface and a second area corresponding to the third surface;
a touch sensor configured to detect a touch input on the first area and the second area;
at least one processor operatively coupled with the touch sensor; and/or
the flexible display, and
wherein the at least one processor is configured to:
in response to detecting closure of the first housing onto the second housing, detect whether an external object is on the first area or the second area to prevent damage to the flexible display, and
in response to detecting the external object is on the first area or the second area, output a notification related to the external object upon activation to prevent damage to the flexible display.

2. The electronic device of claim 1, further comprising:
a second processor in addition to the at least one processor; and
a force touch sensor operatively coupled with the first at least one processor, the force touch sensor configured to detect a pressure intensity of touch inputs,
wherein the external object is detected contacting the first area or the second area when the second processor is in a sleep state, and
wherein the at least one processor is configured to:
detect a pressure intensity of the external object contacting the first area or the second area through the force touch sensor while the second processor is in the sleep state; and
wherein requesting activation of the second processor is further based on the detected pressure intensity.

3. The electronic device of claim 2, wherein the at least one processor is configured to:
while the contact of the external object is maintained, detect whether the pressure intensity of the external object is greater than a threshold pressure intensity,
wherein activation of the second processor is requested when the pressure intensity of the external object is greater than the threshold pressure intensity.

4. The electronic device of claim 2, further comprising a configuration detection sensor configured to detect a distance between the first area and the second area of the flexible display,
wherein detecting whether the external object is obstructing closure further includes detecting whether the distance between the first area and the second area of the flexible display is longer than a predetermined threshold distance while the second processor is in the sleep state, and
wherein detecting that distance between the first area and the second area is longer than the predetermined threshold distance indicates the external object is obstructing closure of the flexible display.

5. The electronic device of claim 4, wherein the touch sensor is deactivated based on detecting that the distance between the first side and the second side is shorter than or equal to the predetermined threshold distance while the second processor is in the sleep state.

6. The electronic device of claim 2, wherein an operating frequency of the touch sensor when the second processor is in the sleep state is shorter than an operating frequency of the touch sensor when the second processor is activated, and
wherein the flexible display is stowed between the first housing and the second housing when the electronic device is disposed in a closed configuration.

7. The electronic device of claim 2, wherein the at least one processor is configured to:
detect whether the external object is distinct from a known input object, based on a distribution of data generated by contact of the external object on the flexible display,
wherein the request to activate the second processor is generated based on detecting that the external object is distinct from the known input object.

8. The electronic device of claim 2, further comprising a haptic actuator operatively coupled with the second processor,
wherein the notification includes a vibration of a predesignated pattern generated by the haptic actuator.

9. The electronic device of claim 2, further comprising a speaker operatively coupled with the second processor,
wherein the notification includes output of an audible warning by the speaker indicating potential damage to the flexible display by the external object.

10. The electronic device of claim 1, wherein the flexible display comprises a polyimide (PI) window.

11. A method for operating in a foldable electronic device having a flexible display, comprising:
in response to detecting closure of a first housing onto a second housing, detecting, by at least one processor, whether an external object is on a first area of the flexible display or a second area of the flexible display to prevent damage to the flexible display; and
in response to detecting the external object is on the first area or the second area, outputting a notification related to the external object to prevent damage to the flexible display.

12. The method of claim 11, wherein the foldable electronic device includes a second processor in addition to the at least one processor, and
wherein the external object is detected on the first area or the second area when the second processor is in a sleep state, the method further comprising:
detecting, by the at least one processor, a pressure intensity of the external object contacting the flexible display using a force touch sensor while the second processor is in the sleep state,
wherein activation of the second processor is requested based on the detected pressure intensity.

13. The method of claim 12, further comprising:
while the contact of the external object is maintained, detecting whether the pressure intensity of the external object is greater than a threshold pressure intensity,
wherein activation of the second processor is requested when the pressure intensity of the external object is greater than the threshold pressure intensity.

14. The method of claim 12, wherein detecting whether the external object is obstructing closure further includes detecting, by a configuration detection sensor, whether a distance between a first area of the flexible display corresponding to the first housing and a second area of the flexible display corresponding to the second housing is longer than a predetermined threshold distance while the second processor is in the sleep state, and wherein detecting that distance between the first area and the second area is longer than the predetermined threshold distance indicates the external object is obstructing closure of the flexible display.

15. The method of claim 14, wherein the electronic device includes a touch sensor, and wherein the touch sensor is deactivated based on detecting that the distance between a first side of the first area and a second side of the second area is less than or equal to the predetermined threshold distance using the configuration detection sensor.

16. The method of claim 12, wherein an operating frequency of the touch sensor when the second processor is in the sleep state is shorter than an operating frequency of the touch sensor when the second processor is activated, and wherein the flexible display is stowed within the foldable electronic device when the foldable electronic device is disposed in a folded configuration.

17. The method of claim 12, further comprising:

detecting whether the external object is distinct from a known input object, based on a distribution of data generated by contact of the external object on the flexible display, wherein the request to activate the second processor is generated based on detecting that the external object is distinct from the known input object.

18. The method of claim 11, wherein the notification includes a vibration of a predesignated pattern generated by a haptic actuator.

19. The method of claim 11, wherein the notification includes output of an audible warning by a speaker, the audible warning indicating potential damage to the flexible display by the external object.

20. An electronic device, comprising:

a first housing including a first surface and a second surface;

a second housing including a third surface and a fourth surface;

a folding part configured to pivotably couple a side surface of the first housing and a side surface of the second housing;

a flexible display disposed on the first surface and the third surface, the flexible display covering the folding part, and including a first area corresponding to the first surface and a second area corresponding to the third surface;

a force touch sensor configured to detect a pressure intensity of a touch input on the flexibly display; and at least one processor operatively coupled with the touch sensor and/or the flexible display, wherein the at least one processor is configured to:

in response to detecting closure of the first housing onto the second housing, detect whether an external object is on the first area or the second area to prevent damage to the flexible display, and in response to detecting the external object is on the first area or the second area, output a notification related to the external object upon activation to prevent damage to the flexible display.

* * * * *